(12) United States Patent
Janin et al.

(10) Patent No.: US 6,626,349 B2
(45) Date of Patent: Sep. 30, 2003

(54) LARGE VIBRATION TOOL, ESPECIALLY FOR WELDING APPLICATIONS

(75) Inventors: Jean-Louis Janin, Fillinges (FR); Jean-Louis Berthet, Cjems/Leman (FR)

(73) Assignee: Mecasonic, Annemasse Cedex (FR)

( * ) Notice: Subject to any disclaimer, the term of this patent is extended or adjusted under 35 U.S.C. 154(b) by 0 days.

(21) Appl. No.: 09/991,872

(22) Filed: Nov. 26, 2001

(65) Prior Publication Data
US 2002/0134813 A1 Sep. 26, 2002

(30) Foreign Application Priority Data
Nov. 28, 2000 (FR) .............................. 00 15345

(51) Int. Cl.$^7$ ................................. B23K 1/06
(52) U.S. Cl. ................... 228/1.1; 156/580.2; 425/174.2
(58) Field of Search .............. 228/1.1, 110.1; 156/73.1, 73.2, 580.1, 580.2; 425/174.2; 264/442, 443, 444, 445

(56) References Cited

U.S. PATENT DOCUMENTS

| | | | |
|---|---|---|---|
| 4,131,505 A | * 12/1978 | Davis, Jr. ................. | 156/580.1 |
| 5,909,498 A | * 6/1999 | Smith ......................... | 381/380 |
| 5,922,170 A | * 7/1999 | Gerdes et al. ............ | 156/580.2 |
| 6,117,086 A | * 9/2000 | Shulze ........................ | 600/488 |
| 6,309,490 B1 | * 10/2001 | Davis et al. ................ | 156/73.3 |

FOREIGN PATENT DOCUMENTS

EP      1210986 A1  *  6/2002

* cited by examiner

*Primary Examiner*—M. Alexandra Elve
*Assistant Examiner*—Kiley Stoner
(74) *Attorney, Agent, or Firm*—Connolly Bove Lodge & Hutz LLP

(57) ABSTRACT

Large vibration tool, vibrating at ultrasonic frequency, especially for applications in the welding, joining or cutting of materials, especially thermoplastics, in cleaning or emulsifying by the activation of a liquid medium, in gas spraying or in shot blasting by blasting any kind of medium, made in the form of a circular sonotrode hollowed out at its center so as to produce a cavity allowing a shape approaching that of a bell to be obtained, said tool having a linking mass providing surface coupling with a vibrational excitation element; at least one circular membrane vibrationally excited at its center or at one end; and at least one tube-shaped final element, the end of which defines the working area of the sonotrode, linked to the linking mass via the said membrane, the latter transmitting the vibration to the said final element whose length is defined by a longitudinal vibration mode tuned to the said excitation frequency.

12 Claims, 3 Drawing Sheets

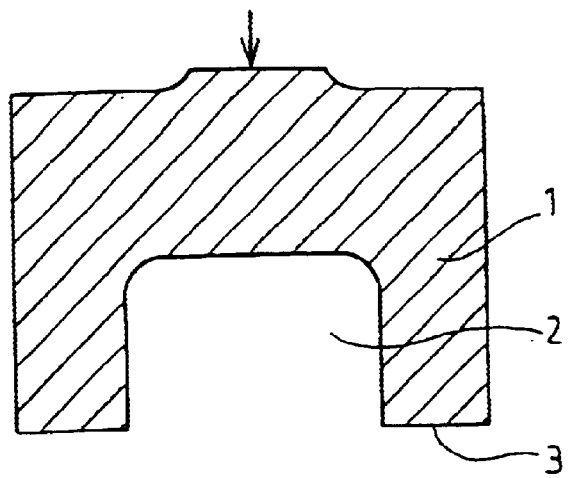
FIG.1
Prior Art
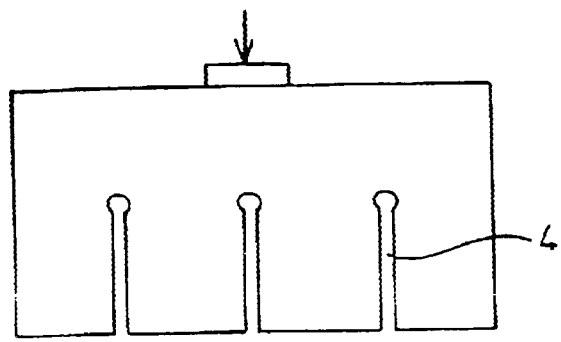
FIG.2
Prior Art
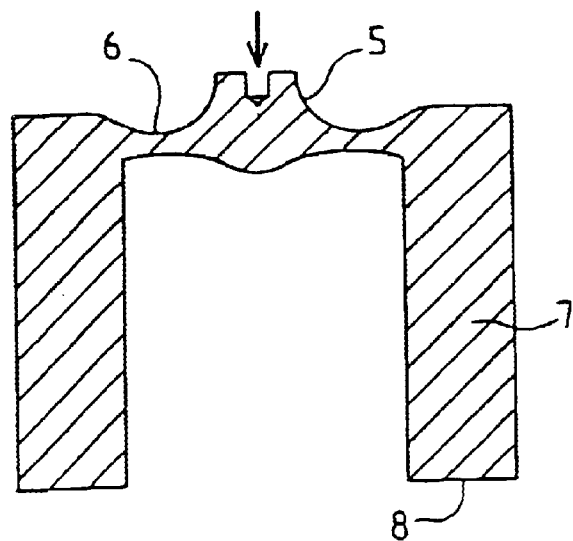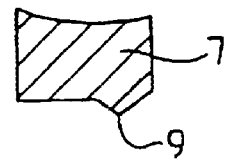
FIG.3　　　FIG.4

LARGE VIBRATION TOOL, ESPECIALLY FOR WELDING APPLICATIONS

BACKGROUND OF THE INVENTION

The present invention relates to a vibration tool, for vibrating at a frequency between 10 kHz and 100 kHz, especially for applications in the welding, joining or cutting of materials, such as for example thermoplastic-based materials, in cleaning or emulsifying by the activation of a liquid medium, in gas spraying or else in shot blasting by blasting any kind of medium.

This invention relates more particularly to a large vibration tool, vibrating at ultrasonic frequency, more commonly called a sonotrode. The technical problem that has to be solved by the present invention is that of obtaining working areas having dimensions hitherto considered to be impossible to obtain by the use of the sonotrodes currently available on the market.

SUMMARY OF THE INVENTION

At the present time, when a person skilled in the art wishes to produce a sonotrode for the purpose of obtaining a surface of revolution such as a disc within the working region, it is impossible for the user to devise a circular sonotrode having a diameter greater than 120 mm with, as a condition, a constant amplitude value at every point on this working area. This is because the vibrations obtained during operation of such a sonotrode are tied on the internal stresses and on the appearance of additional vibration eigenmodes in longitudinal excitation, this being in a manner totally dependent on the increase in size of the sonotrode.

At the present time, the only means allowing a circular sonotrode of large diameter, that is to say a diameter possibly ranging up to 300 mm or more, to be envisaged consists in producing a hollow sonotrode, an illustrative example of which is shown schematically in FIG. 1 of the appended drawings. As this figure shows, this circular sonotrode is machined at its center over a diameter of at least twice the thickness of the wall 1 thus formed. In this way, a hollow 2 is obtained whose depth is limited for reasons of amplification and of transmission of movement at the corresponding longitudinal vibration node at the center of the length of the sonotrode. It should be noted that the length of the sonotrode thus produced is equal to a half-wavelength, which itself depends on the desired vibration frequency and on the speed of sound in the material used to machine this sonotrode.

Thus, as FIG. 1 shows, a sonotrode having approximately the shape of a bell is obtained and the frequency used remains an axial and non-radial vibration. This vibration remains at the limit of what can be used, since the deformation amplitude of the working area 3 is very far from being constant, since it varies by a factor of from 1 to 2 between the points lying on the circumference of the inside diameter and on that of the outside diameter defining this working area. Such a sonotrode therefore allows work only over a very, very narrow circular ring.

Moreover, owing to this deplorable distribution of amplitudes and because of the proximity of the many additional modes which impair the purity of the desired longitudinal vibration, this type of sonotrode is weak and is limited to extremely low working amplitudes, of the order of 30 $\mu$m peak to peak for an element vibrating at 20 kHz. These characteristics are incompatible with the trend in the various applications at the present time and in the future, the requirements generally being for working amplitudes of the order of 50 $\mu$m to 100 $\mu$m for a frequency of 20 kHz.

To try to solve this problem, a number of constructional tricks have been envisaged, among which mention may be made, in particular, of longitudinal slots, which may or may not be emergent, as illustrates at 4 on the sonotrode shown schematically in FIG. 2 of the appended drawings. Such a solution makes it possible to eliminate the extraneous deformations associated with the additional eigenmodes in large sonotrodes, but contributes nothing to the desired quality of deformation over the working area.

Moreover, EP-A-0 313 425 discloses an axisymmetric sonotrode using the excitation principle based on a ring tuned to a defined frequency at so-called radial resonance, using a tube-shaped exciter resonating at this same frequency in a pure longitudinal mode. The longitudinal movement of the exciter is then converted into a transverse movement perpendicular to the axis of revolution of the sonotrode. The drawback with this known solution lies in the fact that the use of converting the movement of the exciter is a special case and does not allow, in particular, transmission of the vibration along one or more parallel axes.

Starting from this state of the art, the present invention sets the objective of producing a range of large sonotrodes, allowing working areas to be achieved which hitherto had been regarded as impossible.

Consequently, this invention relates to a large vibration tool, vibrating at ultrasonic frequency, especially for applications in the welding, joining or cutting of materials, especially thermoplastics, in cleaning or emulsifying by the activation of a liquid medium, in gas spraying or in shot blasting by blasting any kind of medium, made in the form of a circular sonotrode hollowed out at its center so as to produce a cavity allowing a shape approaching that of a bell to be obtained, characterized in that it comprises:

- a linking mass providing surface coupling with a vibrational excitation element;
- at least one circular membrane vibrationally excited at its center or at one end; and
- at least one tube-shaped final element, the end of which defines the working area of the sonotrode, linked to the linking mass via the said membrane, the latter transmitting the vibration to the said final element whose length is defined by a longitudinal vibration mode tuned to the said excitation frequency.

BRIEF DESCRIPTION OF THE FIGURES

Further features and advantages of the present invention will become apparent from the description given below, with reference to the appended drawings which show illustrative embodiments of the invention that are devoid of any limiting character. In the drawings:

FIGS. 1 and 2 schematically illustrate embodiments of bell sonotrodes according to the prior art and discussed above, FIG. 1 being a section in a vertical plane;

FIG. 3 is a schematic view, similar to FIG. 1, showing an illustrative embodiment of a large sonotrode according to the present invention;

FIG. 4 is a partial schematic view showing one version of the working area of a sonotrode according to the invention;

DETAILED DESCRIPTION OF THE INVENTION

Figure 5:
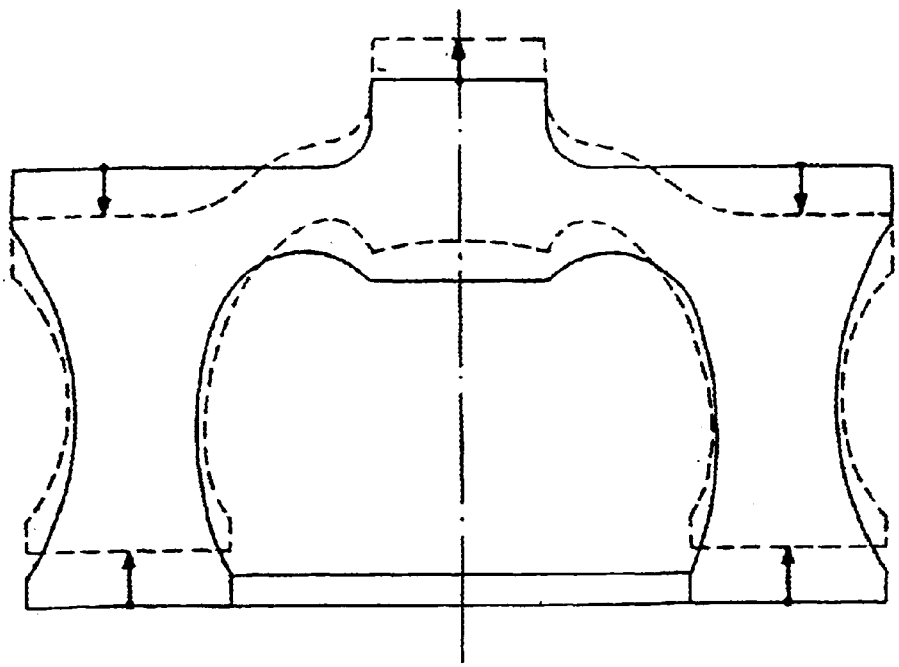
FIGS. 5 and 6 are also schematic views, illustrating the lines of vibration deformation of a bell sonotrode according to the present invention.

Reference is made firstly to FIG. 3, which shows that the sonotrode according to the present invention comprises: a linking mass 5 providing surface coupling with a vibrational excitation element, not shown in the figure but indicated schematically by an arrow; at least one vibrationally excited circular transmission membrane 6 at its center or at one end and at least one tube-shaped final element 7, the end 8 of which defines the working area of the sonotrode. The final element 7 is linked to the linking mass 5 via the membrane 6 so that the latter transmits the vibration to this final element 7 whose length is defined by a longitudinal vibration mode tuned to the excitation frequency.

The linking mass 5 may be made in various shapes, such as, in particular, and by way of non-limiting example, a cubic or cylindrical shape, so as to provide coupling with the vibrational excitation element, for example an emitter, a booster or any extension piece, this element, not shown in the drawing, being an acoustic component of a conventional tool of an ultrasonic system. This coupling may be effected by any conventional means, for example using a built-in or attached screwing member, such as a bolt or screw.

The linking mass 5 undergoes no dilation-compression associated with a vibration eigenmode, but it does undergo, as a body, in space, the movement imparted by the vibration of its surface, which is coupled to the vibrational excitation element. This movement is possible, without deterioration of the linkage, only for a specific and defined stiffness of the membrane or membranes 6, since these membranes act as a linking spring between the mass 5 and the final element 7 of the sonotrode. The invention therefore allows the stiffness of the membrane 6 to be adjusted by means of its shape and its thickness, depending on the moving masses, so as to obtain the desired deformation in a vibration eigenmode tuned to the excitation frequency.

The tube-shaped final element 7 assumes conventional ultrasonic tool shapes except that, with the novel type of vibration transmission, according to the invention it becomes possible to produce large sonotrodes owing to multipoint excitation over surface sectors or over the complete surface of the area opposite the working area. This final element 7 therefore has a length equal to a multiple of half of the wavelength at the excitation frequency in question.

Figure 6:
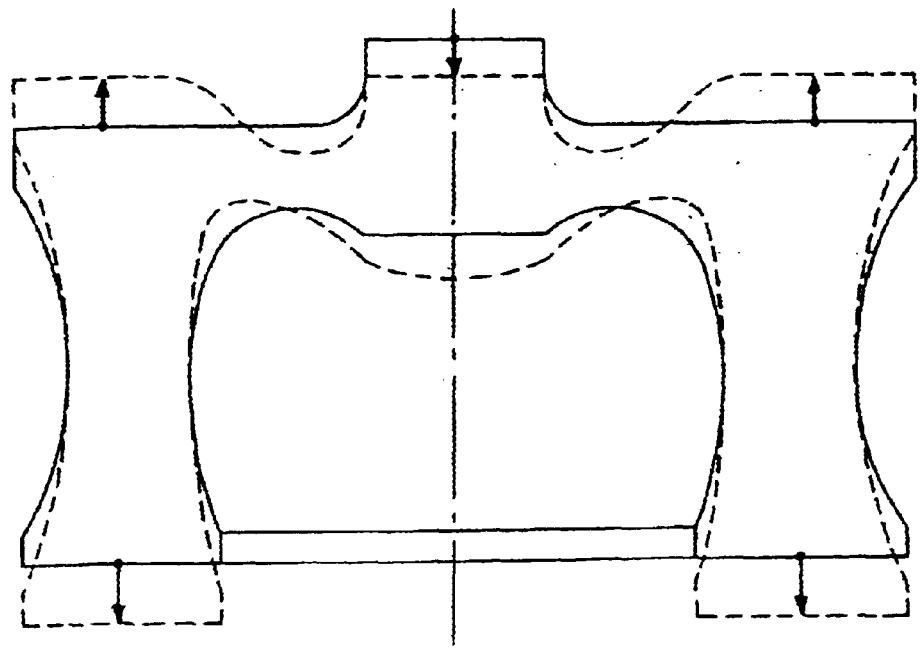

FIGS. 5 and 6 show, respectively, the line of deformation in compression and the line of deformation in extension of a bell sonotrode according to the present invention which result from the excitation vibration.

Given below are the features of a sonotrode produced according to the present invention. This is merely one preferred embodiment, devoid of any limiting character.

This circular sonotrode has an outside diameter of 150 to 300 mm for operation at a frequency of 20 kHz. It is made from a linking mass 5 having a diameter of 40 mm and a height of 40 mm and from a continuous circular membrane 6 having a thickness of around 25 mm with connecting radii of around 25 mm at each of the ends, which are linked to the linking mass 5 or to the final element 7, the latter being in the form of a cylindrical tube of circular cross section, with a diameter of 150 to 300 mm and a wall thickness possibly up to 70 mm.

Such a sonotrode makes it possible to obtain very large working areas with maximum internal stresses not exceeding 100 N/mm$^2$ for a peak-to-peak vibration amplitude of 60 μm.

It will be noted that, since the tube-shaped final element thus formed vibrates in a pure longitudinal mode, all the current knowledge regarding ultrasonic tool shapes can be applied to it. This is because the half-section of this tube-shaped final element can follow the laws established for the cross sections of smaller sonotrodes.

The amplitude and the length of the tube-shaped final element may be increased or decreased using known principles of varying the cross-sectional width, depending on the characteristic regions, from a vibratory standpoint, of the length.

According to the present invention, the cylindrical tube-shaped final element 7 may be extended by multiples of half the wavelength or by adding other sonotrodes, thereby making it possible to produce sonotrodes called compound sonotrodes, thus increasing the amplitude, by focusing on a set of points or on one or more lines, or even a complex surface. For particular applications, the final element 7 may be used over its two extreme working areas.

Other sonotrodes extending the final element 7 may be added by any conventional connection means, for example using bolts, especially frequency-tuned bolts as described in FR-A-2 541 159.

The working area 8 of the final element 7 may be designed so that the latter can be used either over all or over only part of its working area. It is also possible, should complex profiles be needed so as to reduce the impedance brought about by the load that the sonotrode/workpiece contact represents, to produce a working area shape such as, for example, a lip, a skid, a projection, a counterbore or any other positive or negative relief, without any restriction in space, directly on the extreme working area or areas 8 of the cylindrical final element 7. Thus, FIG. 4 of the appended drawings illustrates an embodiment in which the working area of the final element 7 is in the form of a circular toothing 9. Of course, this is merely illustrative one embodiment.

Since the shape of the cross section of the membrane 6 depends directly on the inside diameter of the linking mass, it is possible as a result to produce a tube-shaped final element 7 with a profile which is no longer cylindrical, but complex, for example one based on a square, rectangle, triangle, diamond, oval or other such shapes.

When the membrane 6 has a complex shape, for example with a varying cross section, it may be divided into several transmission membranes by judiciously providing apertures placed according to the linkages. By way of example, it is possible to produce a tube-shaped final element 7 having a square profile, with four membranes assigned respectively to each of the four sides and representing a four-armed star shape, starting from the central linking mass 5. The length of the arms represented by the membranes can therefore be varied, in pairs in the case of a rectangular profile.

Figure 7:
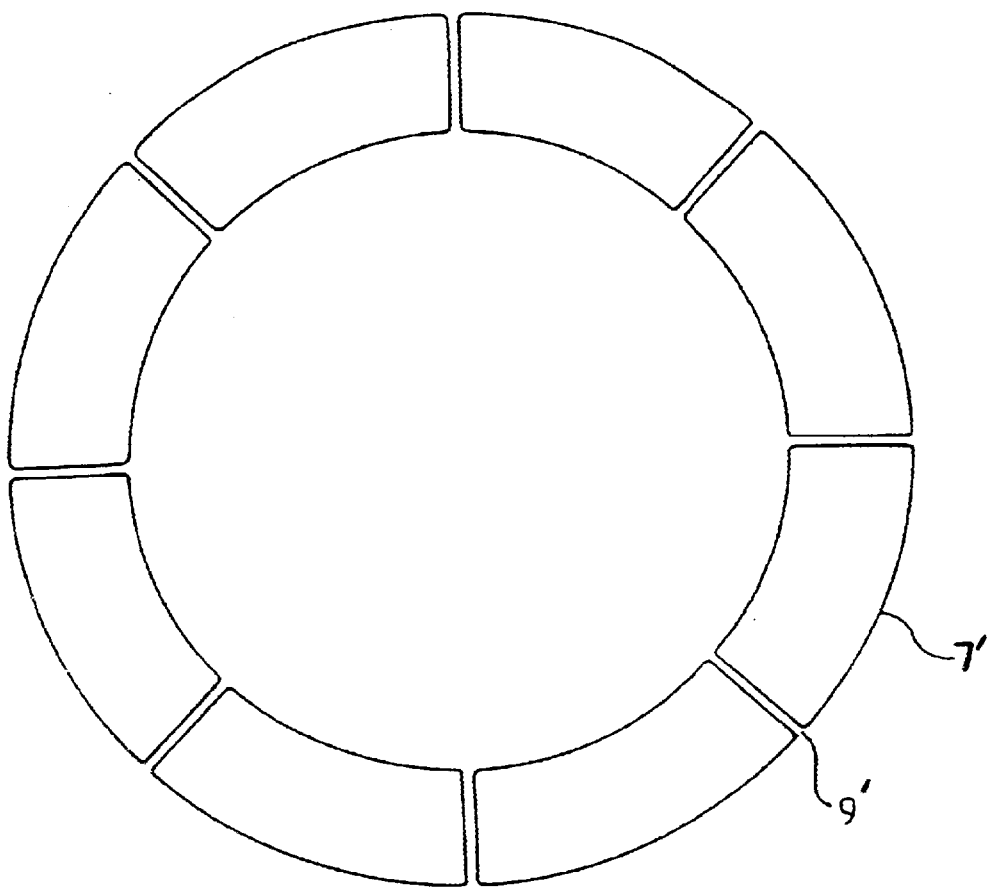
FIG. 7 is a plan view showing a variant of the final element of a sonotrode according to the present invention.

Likewise, should it be necessary to devise a final element 7 of a particularly complex shape, it is possible to cut it, completely or partially, into emergent or non-emergent slots. These slots may vary in width, and have parallel or non-parallel axes, or straight or non-straight axes. FIG. 7 of the appended drawings shows, in plan view, a non-limiting illustrative embodiment of a final element 7 cut into slots 9'. The formation of such slots may require, for problems due to the distribution of vibration amplitudes over the working area and to the separation of the close frequencies deleterious to proper operation of the sonotrode, variations in width, variations in length or variations in position relative to one another.

It will of course be understood that the present invention is not limited to the illustrative embodiments described and shown above, but that it encompasses all the variants thereof.

What is claimed is:

1. A large vibration tool in a form of a generally bell shaped sonotrode, hollowed out at its center and comprising:

a linking mass connected to a closed end of the sonotrode for providing a coupling to a vibrational excitation element;

the closed end of the sonotrode having at least one circular membrane capable of vibrating; and at least one tube-shaped element, an opened end of which defines a working area of the sonotrode, the tube-shaped element extending from the membrane to vibrate with the membrane when vibration is transmitted by the linking mass;

the length of the tube-shaped element being defined by a longitudinal vibration mode tuned to an excitation frequency.

2. A tool according to claim 1, wherein the membrane shape and its stifthess are chosen according to moving masses of the membrane, linking mass, and tube shaped element, in order to obtain a desired deformation in a vibration eigenmode tuned to the excitation frequency, and wherein the membrane performs as a spring between the linking mass and the tube-shaped element.

3. A tool according to claim 1, wherein the linking mass is of cubic shape.

4. A tool according to claim 1, wherein the linking mass is of cylindrical shape.

5. A tool according to claim 1, wherein the tube-shaped element has a length equal to a multiple of half a wavelength of the excitation frequency.

6. A tool according to claim 1, wherein the tube-shaped final element is extended by multiples of a half-wavelength.

7. A tool according to claim 1, wherein the tube-shaped element is extended by adding other sonotrodes, the added sonotrodes being attached by fasteners.

8. A tool according to claim 1, wherein an outward transverse working area of the tube-shaped element has a selected positive or negative relief.

9. A tool according to claim 1, wherein the tube-shaped element has a cylindrical tube shape.

10. A tool according to claim 1, wherein the tube-shaped element has a complex profile chosen from a square, rectangle, triangle, diamond or oval.

11. A tool according to claim 1, wherein the tube-shaped element is selectively shaped to include emergent or non-emergent slots.

12. A tool according to claim 1, wherein the membrane is divided into several transmission membranes.

* * * * *